No. 841,780. PATENTED JAN. 22, 1907.
J. O. HOBBS.
MECHANISM FOR STARTING HYDROCARBON ENGINES.
APPLICATION FILED FEB. 13, 1904.
3 SHEETS—SHEET 1.
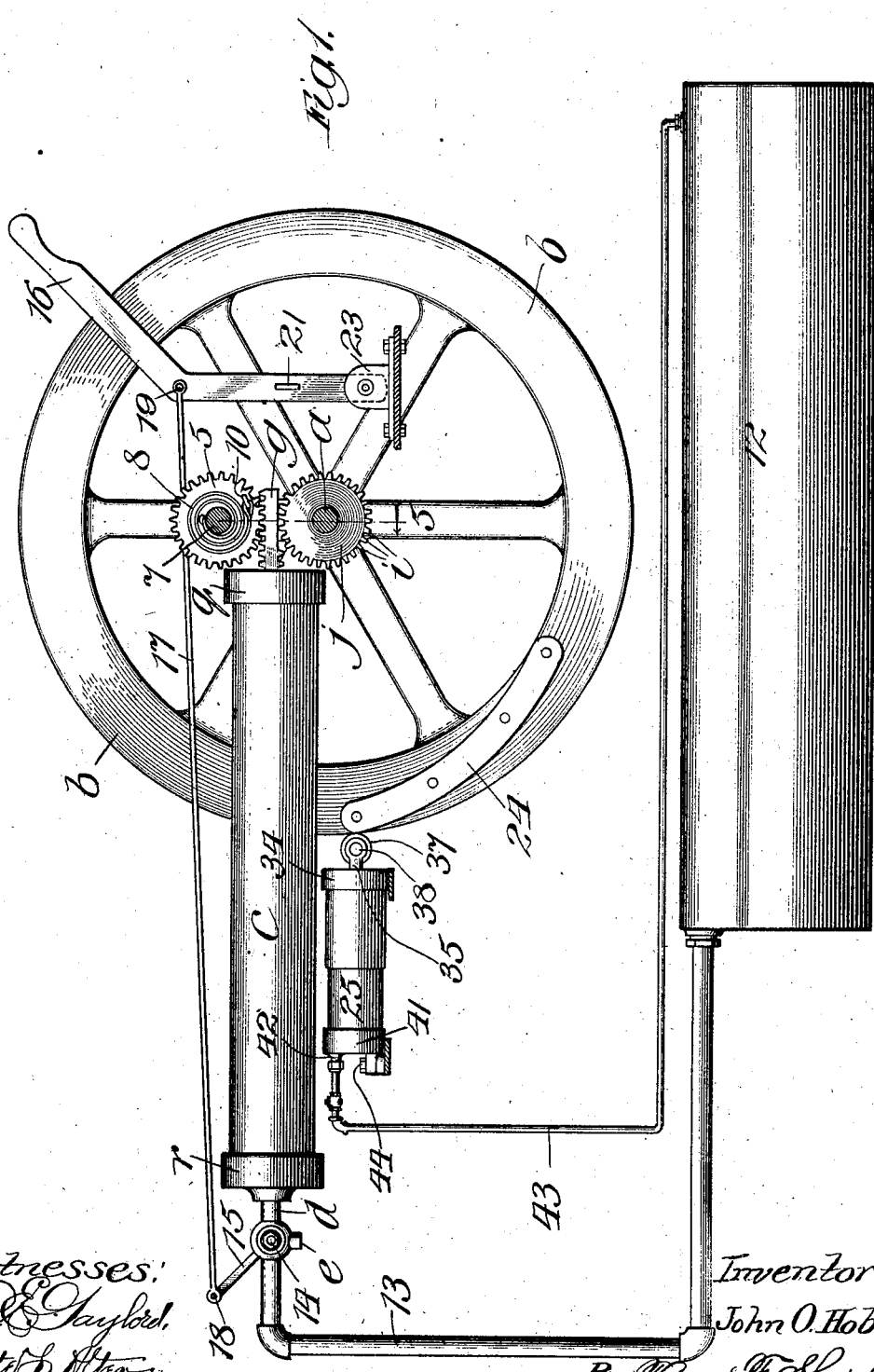
Witnesses:
Inventor:
John O. Hobbs,
By Thomas F. Sheridan,
Atty.

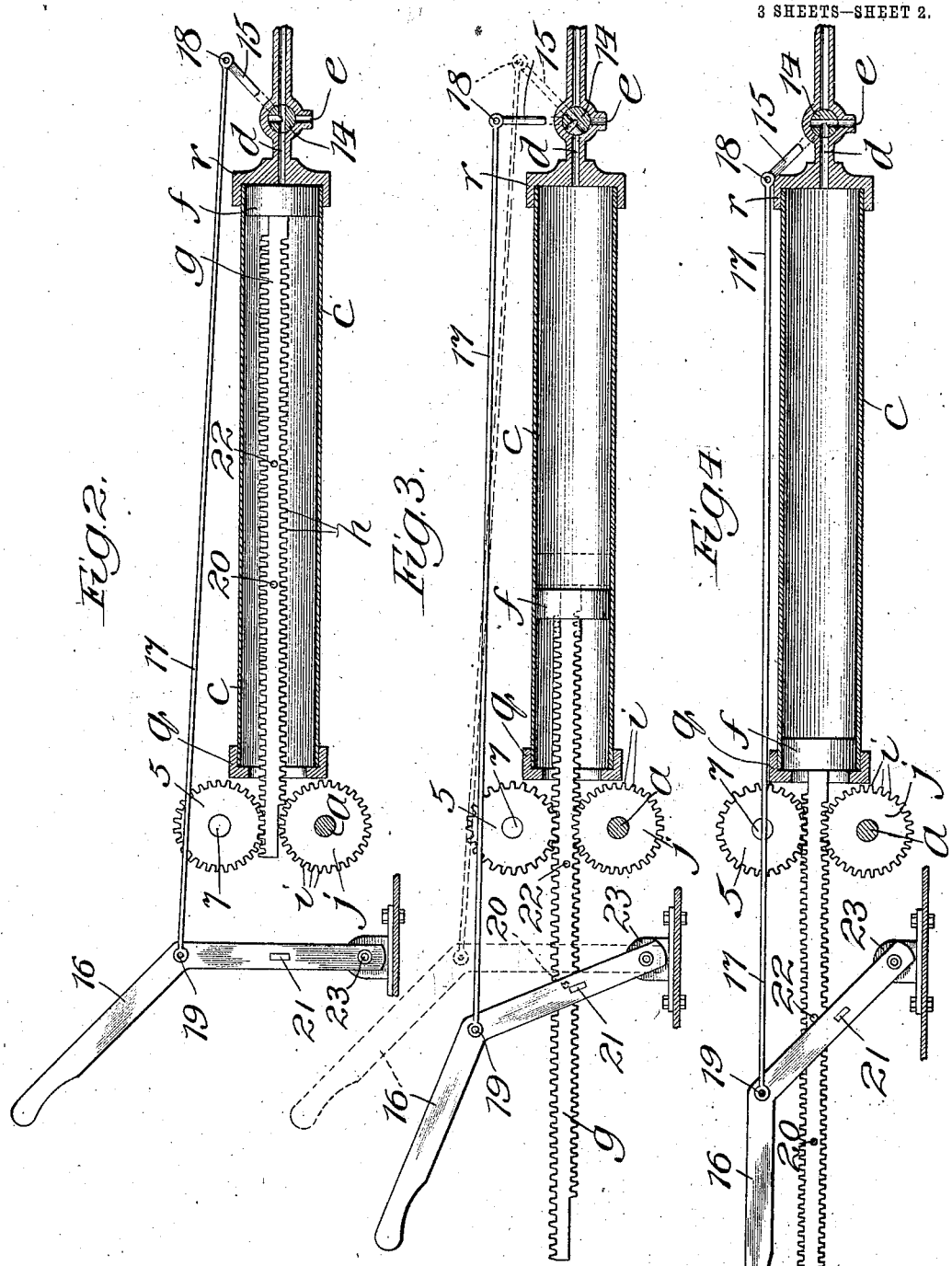

No. 841,780. PATENTED JAN. 22, 1907.
J. O. HOBBS.
MECHANISM FOR STARTING HYDROCARBON ENGINES.
APPLICATION FILED FEB. 13, 1904.
3 SHEETS—SHEET 3.
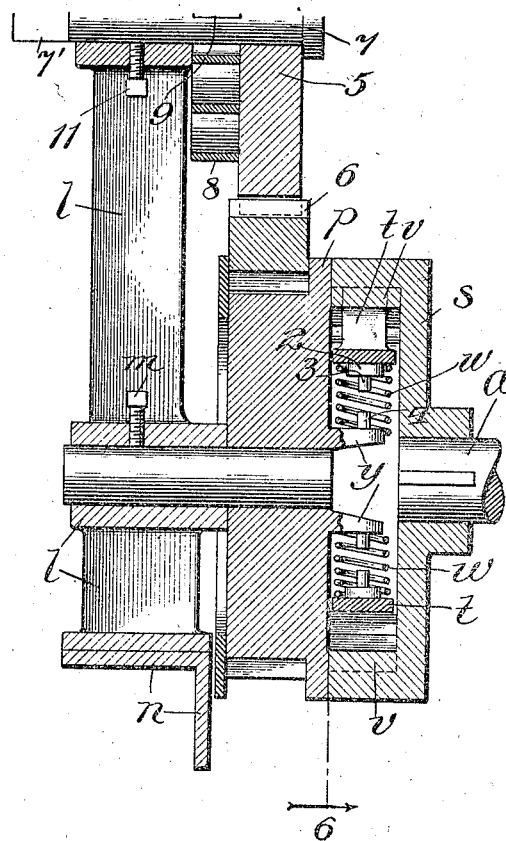
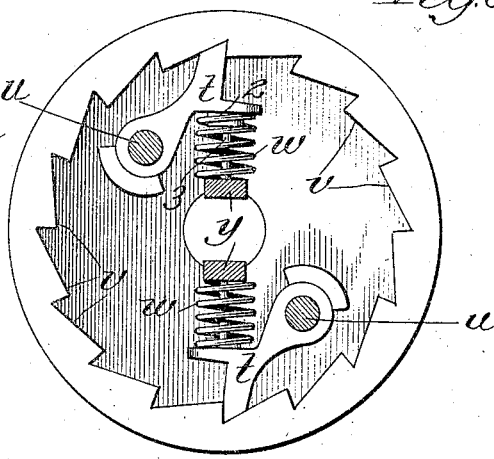
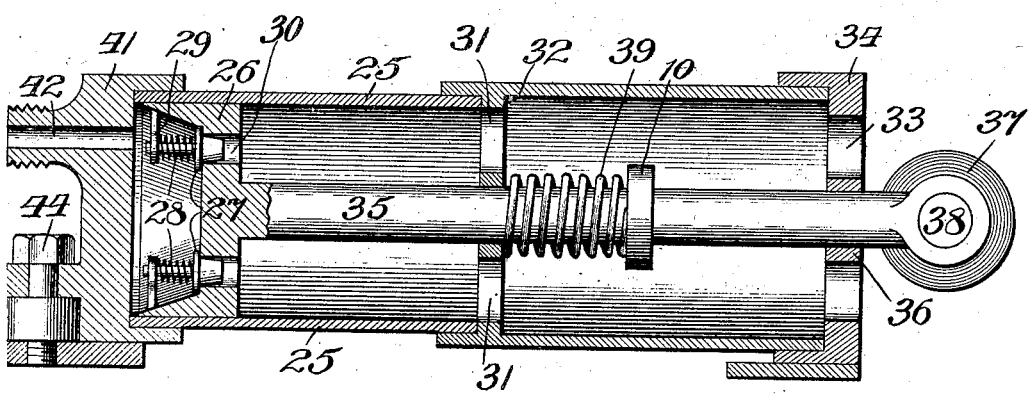
Witnesses:
Inventor:
John O. Hobbs,
By Thomas F. Sheridan,
Att'y

UNITED STATES PATENT OFFICE.

JOHN O. HOBBS, OF CHICAGO, ILLINOIS.

MECHANISM FOR STARTING HYDROCARBON-ENGINES.

No. 841,780.  Specification of Letters Patent.  Patented Jan. 22, 1907.

Application filed February 13, 1904. Serial No. 193,464.

*To all whom it may concern:*

Be it known that I, JOHN O. HOBBS, a citizen of the United States, residing at Chicago, in the county of Cook and State of Illinois, am the inventor of certain new and useful Improvements in Mechanisms for Starting Hydrocarbon-Engines, of which the following is a specification.

My invention relates to that class of mechanisms for starting engines comprising a shaft connected with the piston of the main engine, an auxiliary piston-cylinder connected with a suitable source of fluid under pressure and provided with a piston mounted therein, means for connecting such auxiliary piston with the starting-shaft, and means for admitting fluid under pressure to such auxiliary piston-cylinder for operating such auxiliary piston, and thereby the starting-shaft.

It relates particularly to the means employed for giving the starting-shaft, and thereby the main piston, the necessary initial impulse preceding the ignition of the first charge, so as to set the engine in operation.

The principal object of my invention is to provide a simple, economical, and efficient mechanism for starting hydrocarbon-engines.

Other and further objects of the invention will appear from an examination of the drawings and the following description and claims.

The invention consists in the features, combinations, and details of construction hereinafter described and claimed.

In the accompanying drawings, Figure 1 is a view in elevation of an engine-starter constructed in accordance with my improvements; Fig. 2, a longitudinal sectional elevation of a portion thereof, showing the auxiliary piston-cylinder with its piston mechanism in initial position; Fig. 3, a similar view of the parts shown in Fig. 2, showing the mechanism for controlling the inlet of fluid under pressure in its second position and the fluid-inlet passage closed; Fig. 4, a similar view of the parts shown in Figs. 2 and 3, showing the mechanism for controlling the fluid-inlet passage in the third position with the outlet-passage open, so as to permit the escape of the fluid from behind the piston; Fig. 5, a sectional elevation taken on line 5 of Fig. 1, showing the means for connecting and disconnecting the auxiliary piston and starting-shaft and the means for returning the auxiliary piston to initial postion; Fig. 6, a sectional view in elevation, taken on line 6 of Fig. 6, looking in the direction of the arrow and showing the starting-shaft ratchet and the manner of mounting the pawls which engage such ratchet; and Fig. 7, a longitudinal central elevation of the auxiliary piston-cylinder mechanism.

In the art to which this invention relates it is well known that the starting-shaft $a$ may be either an auxiliary shaft or may be in the form of a crank-shaft connected to the main piston of the engine of an automobile in any ordinary manner and provided with a flywheel $b$. The shaft $a$ here shown is the ordinary crank-shaft, and as the construction and manner of connecting such crank-shafts with the piston of the main engine by means of connecting-rods is well known to those skilled in the art it is not deemed necessary to describe the same here.

It is very desirable to provide suitable means for giving this starting-shaft, which, as already suggested, may be either an auxiliary shaft or a crank-shaft, the necessary impulse to start the engine in operation prior to the ignition or expansion of the first charge of the fluid under pressure. In the case of gas or gasolene engines it is desirable that this first impulse of the starting-shaft be sufficient to start the sparker in operation, so that such sparker may ignite the first and subsequent charges and the engine be thus set in operation.

It is now common to give the starting-shaft its initial impulse by means of a crank turned by hand, and although various mechanical expedients have been employed to accomplish this purpose the use of the hand-crank is general, if not almost universal, and it is very desirable that a simple, economical, and efficient mechanism be provided for starting engines, particularly automobile-engines. In order to accomplish this purpose, I provide an auxiliary piston-cylinder $c$, having an inlet-passage $d$, which communicates with a suitable source of fluid under pressure, and an outlet-passage $e$. An auxiliary piston $f$ is mounted in such piston-cylinder and provided with a piston-rod $g$. In order to connect this piston-rod and piston with the starting-shaft for the purpose of producing the desired initial impulse to such starting-shaft, the piston-rod is provided with rack-teeth $h$, preferably upon its under side, which mesh with the cogs $i$ of a pinion $j$. This pinion is rotatably mounted upon a rigid shaft $k$, which is in alinement with the axial center of the starting-shaft, such fixed shaft being mounted in a suitable socket portion of a supporting-standard $l$ and held in position by means of a set-screw $m$ in threaded engagement with such standard, the standard, auxiliary cylinder, and starting-shaft being mounted upon the frame $n$ of the vehicle in any ordinary manner, so that such parts will be suitably supported.

The pinion $j$ is provided with annular side flanges $p$, which engage the sides of the rack portion of the auxiliary piston-rod, so as to form a suitable guide for such piston-rod, and by extending the ratchet-teeth along the under side of the piston-rod substantially the entire length thereof it will be seen that the auxiliary piston-cylinder mechanism and its operating mechanism is in very compact form, permitting the play of the auxiliary piston the entire length of the piston-cylinder from its open end $q$ to the front cylinder-head $r$, the length of the stroke being sufficient to produce the desired number of revolutions of the pinion and of the starting-shaft. The pinion $j$ is operatively connected to the starting-shaft by means of a ratchet $s$, which is mounted upon the starting-shaft in fixed relation thereto and adjacent to such pinion. Pawls $t$ are pivotally mounted upon the pinion by means of pivot-pins $u$, so as to engage the inner ratchet-teeth $v$, and suitable coil-springs $w$ are mounted upon supporting-studs $y$, which project from the side of the pinion and form suitable seats for such springs, spring-seats 2 being provided upon the swinging ends of pawls and having center studs 3, corresponding to studs 4, upon the opposite spring-seats for holding the springs in engagement with the pawls and the latter in yielding engagement with the ratchet-teeth of the ratchet $s$.

By this arrangement it will be readily seen that the movement of the auxiliary piston and rack to the left from the position shown in Fig. 2 will cause the rotation of the pinion in a corresponding direction, so as to produce the desired initial impulse to the starting-shaft and that the arrangement of the pawl and ratchet will permit the auxiliary piston and its rack to be returned to initial position or to remain in any desired position, while permitting the continued rotation of the starting-shaft in the direction in which it has been set in motion.

It is well known to those skilled in the art that when the first charge is ignited it sometimes occurs that the starting-shaft is accidentally rotated or "kicked" in a backward direction, and it is therefore very desirable that means be provided for preventing injury to the starting mechanism by reason of such contingency.

In order to accomplish this and to provide means for returning the auxiliary piston and its rack to inital position, the extreme outer end portion of the piston-rod is made smooth on its under side, so as to permit the rotation of the pinion independently of the rack when the rack is in its initial position. For moving the rack and auxiliary piston back to initial position I provide a second pinion 5, the teeth of which mesh with the rack-teeth 6, which I prefer to arrange upon the upper side of the piston-rod opposite the rack-teeth $h$. This second pinion is rotatably mounted upon a fixed shaft 7, which is in turn mounted in a suitable socket in the standard $l$, already described, and a coil-spring 8 is provided having its inner end extending through a central opening 9 in such shaft and its outer end connected to the pinion 5 by means of a pin 10. This spring is wound to the desired tension by rotating the shaft 7 by means of a key fitted to the squared end 7' of such shaft, and when the desired tension is reached the shaft and spring are held against such tension by means of the set-screw 11, which is mounted in threaded engagement with the socket portion of the standard and with its inner end in engagement with such shaft. Only half of the upper socket portion of the standard $l$ is shown in Fig. 5, but it is substantially identical with the lower socket.

The initial movement of the auxiliary piston and rack will rotate the pinion 5 against the tension of the spring, and the spring will when the air under pressure is allowed to escape from the auxiliary piston-cylinder throw the piston and rack back to initial position. The extreme end portion of the rack which engages the pinion $j$ when such rack is in its initial postion is made smooth, as above suggested, so that such pinion may rotate independently of the rack and will only engage the teeth of the rack when such rack is moved by the impulse of the auxiliary piston. At all times when the rack-teeth are in engagement with the teeth of the piston $j$ during the stroke of the piston there is an elastic cushion of air behind the piston, which yieldingly resists the backward movement due to the "kicking back" of the engine. This prevents injury to the parts when a rack with a smooth end portion is used, as above described, the rack-teeth being out of engagement with the pinion-teeth when the piston is in initial position.

By this arrangement it will be readily seen that a suitable and efficient means is provided for preventing injury of the parts by the kicking back of the engine and consequent accidental rotation of the starting-shaft in a backward direction and that the auxiliary piston and its rack are moved to their initial position quickly and efficiently by means of the above-described mechanism for such purpose.

In order to provide means for supplying fluid under pressure to the auxiliary piston-cylinder and to provide suitable means for controlling the inlet and outlet of such pressure fluid, a fluid-pressure tank 12 is provided of sufficient size to contain the necessary amount of fluid under pressure to operate the auxiliary piston mechanism. This tank is connected with the auxiliary piston-cylinder by means of a pipe 13, which forms a passage from the tank to the cylinder, and a three-way cock 14 is mounted in such passage between the tank and auxiliary piston-chamber and provided with a cock-lever 15, connected to an operating-lever 16 by means of a connecting-rod 17, such rod being pivotally connected to the outer swinging end of the cock-lever and to such operating-lever by means of pivot-pins 18 and 19. The pressure-tank being filled with fluid under pressure, the movement of the operating-lever to the position shown in Fig. 2 will leave the inlet-passage open, so as to permit fluid under pressure to the parts from such tank into the pressure-chamber of the auxiliary piston-cylinder, so as to force the auxiliary piston toward the pinion which meshes with the rack portion of the piston-rod.

In order to provide means for automatically closing the fluid-passage when the desired amount of fluid under pressure has been admitted to the auxiliary piston-cylinder, a pin or stud 20 is mounted upon one side of the piston-rod, and a similar pin or stud 21 is mounted upon the operating-lever, so as to extend into the path of the pin 20. By this arrangement when the piston is moved from the position shown in Fig. 2 to the position shown in Fig. 3 the pin 20 on the piston-rod engages the stud 21 upon the operating-lever and throws such operating-lever, and thereby the three-way cock, from the position shown in dotted lines in Fig. 3 to the position in full lines in such figure. The fluid-inlet passage is thus closed automatically, and the expansion of the fluid under pressure behind the piston causes it to pass on to the position shown in Fig. 4. When the piston and its rack have reached this third position, it is desirable that the outlet-opening from the pressure-chamber formed by the piston-cylinder be opened, the inlet-passage remaining closed. In order that this may be accomplished automatically, a second pin or stud 22 is mounted upon the piston-rod, such pin being of greater length than the pin 20 and of sufficient length to engage the operating-lever and move it from the position shown in full lines in Fig. 3 to the position shown in full lines in Fig. 4, thus throwing the three-way cock to the position shown in Fig. 4 and opening the outlet-passage from the piston-chamber. When the parts have reached this position, the fluid under pressure is allowed to escape from the piston-cylinder, and the spring 8 is thus permitted to rotate the pinion 5 and, thereby throw the piston back to its initial position. This leaves the operating-lever in the position shown in Fig. 4, and when another operation of the parts as above described is desired it is only necessary to raise the operating-lever to the position shown in Fig. 2, which will admit the fluid under pressure with the same result as before, giving the starting-shaft the necessary initial impulse. The operating-lever 16 is pivotally mounted upon a suitable supporting-bracket 23, which is in turn mounted upon the main frame of the machine in any ordinary manner.

It is necessary to provide suitable means for supplying the pressure-chamber with fluid under pressure to be used as above suggested. In order to accomplish this, I mount a cam 24 upon the side of the fly-wheel $b$, and a suitable pump is provided and operatively connected with such cam and provided with a passage leading to the fluid-pressure tank or reservoir already described. This pump comprises a pump-cylinder 25, which I prefer to make in two parts, as shown in Fig. 7, so as to enable the same to be readily assembled and produce the desired rigidity of the parts.

A suitable piston 26 is provided with valves 27, held yieldingly in closed position by means of springs 28, which are mounted upon spring-seats 29 upon such piston. These valves are seated in inlet-openings 30 in the piston, which communicate with the outer atmosphere through openings 31 in the central partition 32 and opening 33 in the rear head 34. The central partition is provided with an axial perforation, through which the piston-rod 35 extends, and the rear head is provided with a similar perforation or central socket portion 36, which forms a guide for the piston-rod adapted to withstand the strains to which such piston-rod is subjected by the stroke of the cam. The outer end of the piston-rod is provided with an idler-roll 37, rotatably mounted therein upon a journal 38, and a helical spring 39 encircles the piston-rod intermediate the central partition and in engagement with a collar 40 upon such rod, so as to move the piston in the direction opposite to that in which it is moved by the cam. The front head 41 of the pump-cylinder is provided with a passage 42, which extends through pipe 43 to the compression tank or reservoir already described. The pump-cylinder is pivotally mounted upon the frame of the automobile by means of heavy bolts 44, extending through a socket portion 44' at the end of the pump-cylinder, or in any ordinary and well-known manner, so as to be held firmly in operative position, but so as to allow the cylinder to swing upon its pivot sufficiently to throw the piston-rod out of the path of the cam when it is desirable to stop the operation of the pump.

By this arrangement it will be readily seen that the movement of the fly-wheel and cam in a direction corresponding to the rotation of the starting-shaft, as already described, will cause the cam to engage the idler-roll upon the outer end of the pump-piston rod, such rod being held in the path of the cam by means of the spring 39. The pump-piston is thus forced forward to the position shown in Fig. 7, and as the cam moves onward out of engagement with the pump-piston rod the pump-piston is thrown back to initial position by means of the spring 39, the valves opening, so as to admit air to the pressure-chamber of the pump to be compressed and forced into the fluid-pressure reservoir by means of the next motion of the pump-piston. The fluid-pressure reservoir may thus be kept constantly charged with sufficient fluid under pressure to operate the starting mechanism.

I claim—

1. A gas-engine-starting device, comprising a starting-shaft, an auxiliary cylinder, a piston therein, a piston-rod connected to the piston and to the starting-shaft, means for admitting compressed fluid to the cylinder, and means operated by the movement of the piston-rod to regulate the amount of fluid delivered to the cylinder.

2. A gas-engine-starting device, comprising a starting-shaft, an auxiliary cylinder, a piston therein, a piston-rod connected to the piston and to the starting-shaft, means for admitting compressed fluid to the cylinder, means operated by the movement of the piston-rod to regulate the amount of fluid delivered to the cylinder, and means also controlled by the movement of the piston-rod to open the cylinder to the atmosphere.

3. A gas-engine-starting device, comprising a cylinder, a piston therein, a piston-rod connected to the piston, hand-operated means for admitting motive fluid to the cylinder, and means automatically operated by the movement of the piston-rod to regulate the amount of motive fluid delivered to the cylinder.

4. A gas-engine-starting device, comprising a cylinder, a piston therein, a piston-rod connected to the piston, an inlet at one end of the cylinder connected to a compressed-fluid supply and having an opening to the atmosphere, a three-way valve controlling the inlet and the opening, a lever suitably connected to the valve to operate the valve, and projections on the piston-rod engaging the lever during the movement of the rod to operate the valve at predetermined times.

5. A gas-engine-starting device, comprising a starting-shaft, an auxiliary cylinder, means for admitting compressed fluid to the cylinder, a piston mounted in the cylinder, a piston-rod connected with the piston and provided with rack-teeth, a pinion connected with the starting-shaft and having teeth in engagement with the rack-teeth upon the piston-rod, means for opening the inlet-passage to the auxiliary cylinder, automatically-operated means to control the amount of fluid admitted to the cylinder to move the piston in one direction, and means for moving the piston in the opposite direction.

6. A gas-engine-starting device, comprising a starting-shaft, an auxiliary cylinder provided with an inlet-passage, a source of compressed-fluid supply, a piston mounted in the cylinder, means for connecting the piston with the starting-shaft, means for opening the inlet-passage to admit compressed fluid to the cylinder, automatically-operated means for regulating the amount of fluid delivered to the piston to move the piston in one direction, automatically-operated means for opening the cylinder to the atmosphere, and means for moving the piston in the opposite direction, substantially as described.

JOHN O. HOBBS.

Witnesses:
HARRY I. CROMER,
MAUDE DARNELL.